July 8, 1930.                       G. RILEY                  1,770,111
                        INTERNAL COMBUSTION ENGINE
                         Filed Oct. 3, 1927         4 Sheets-Sheet 2
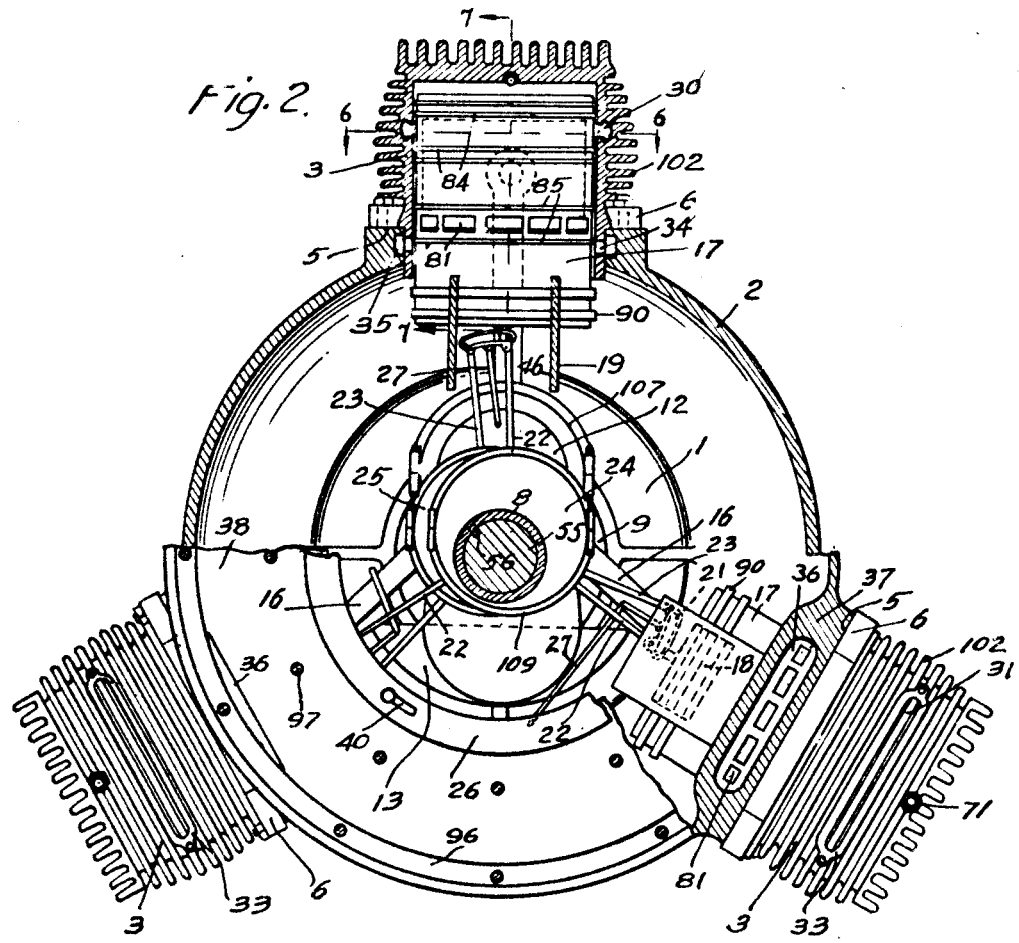
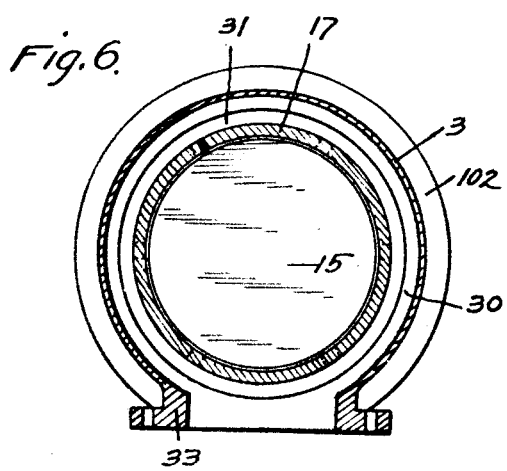
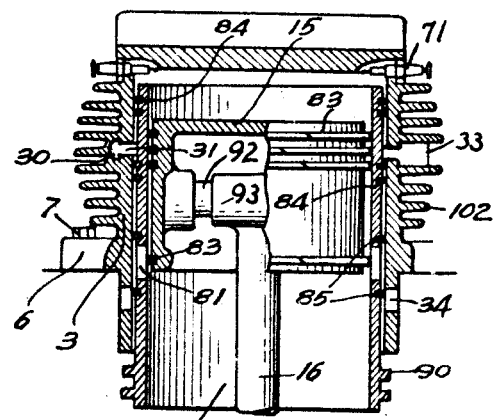
INVENTOR.
George Riley,
BY
R. W. Smith
ATTORNEY.

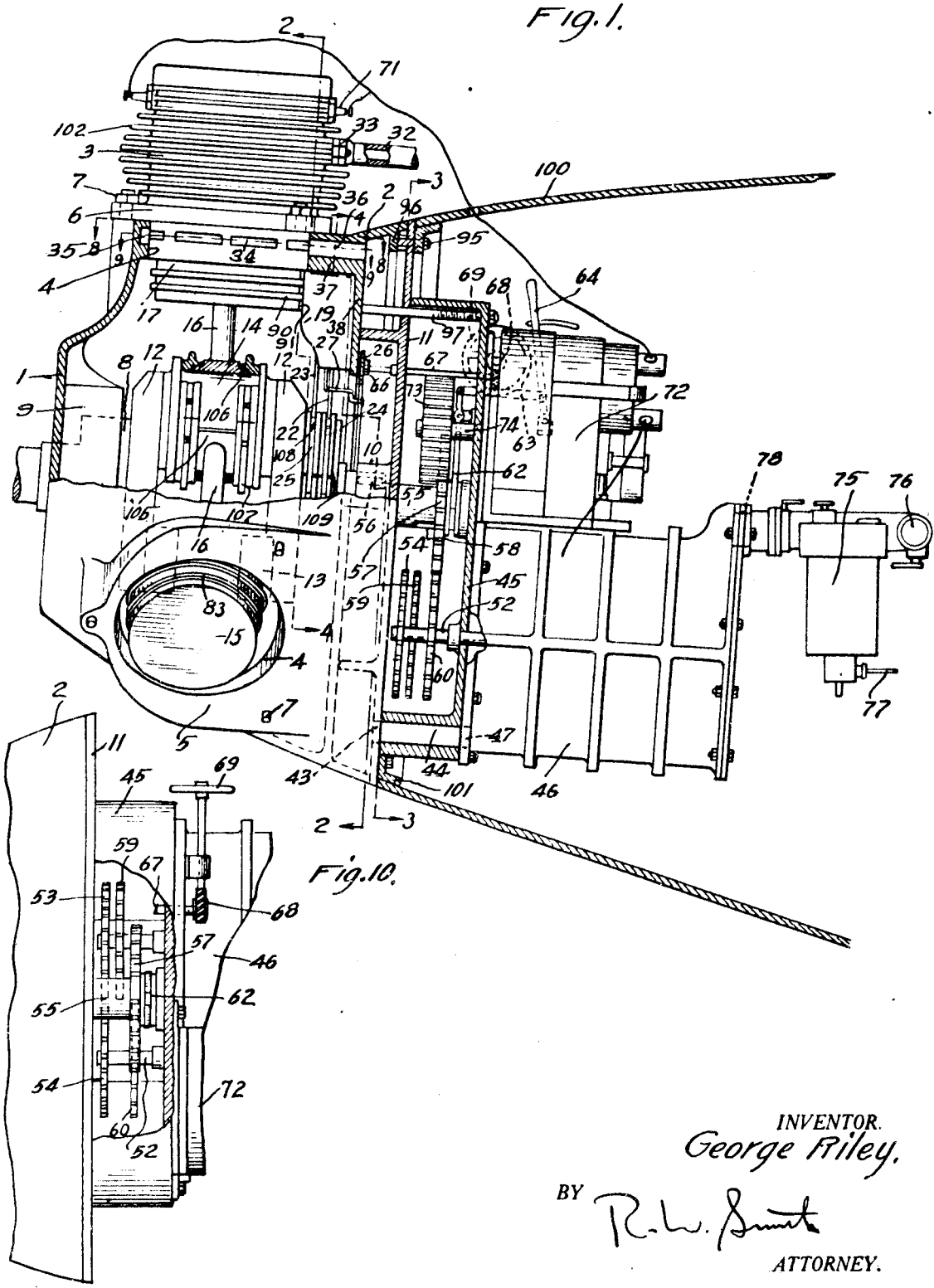

July 8, 1930. G. RILEY 1,770,111
INTERNAL COMBUSTION ENGINE
Filed Oct. 3, 1927 4 Sheets-Sheet 3
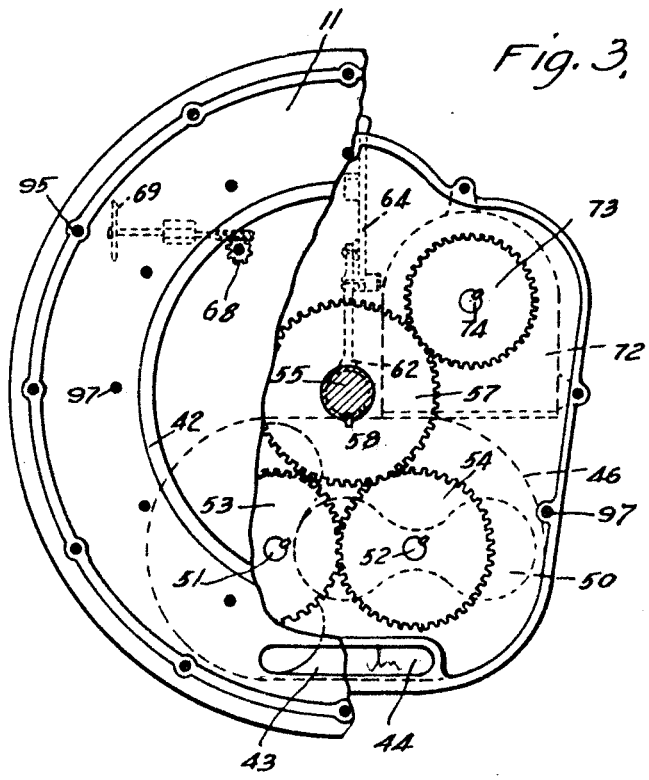
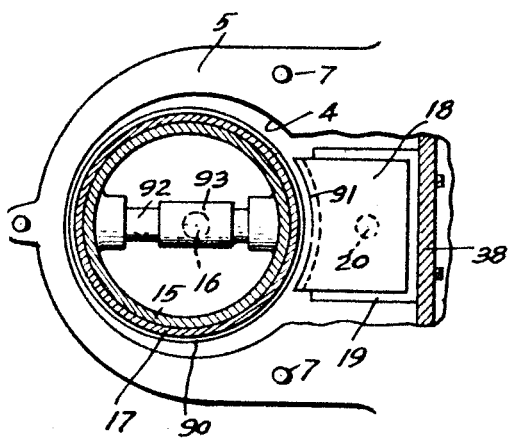
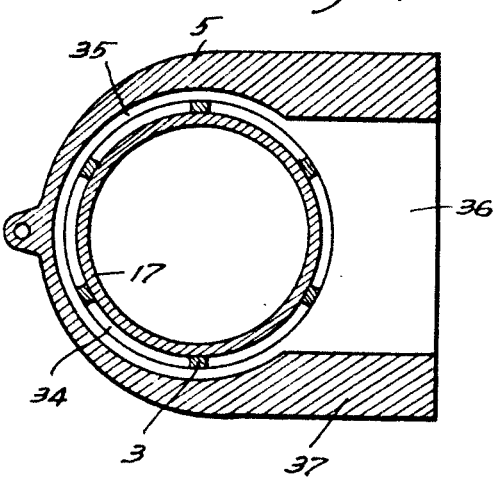
INVENTOR.
George Riley,
BY
R W Smith
ATTORNEY.

July 8, 1930.  G. RILEY  1,770,111
INTERNAL COMBUSTION ENGINE
Filed Oct. 3, 1927    4 Sheets-Sheet 4
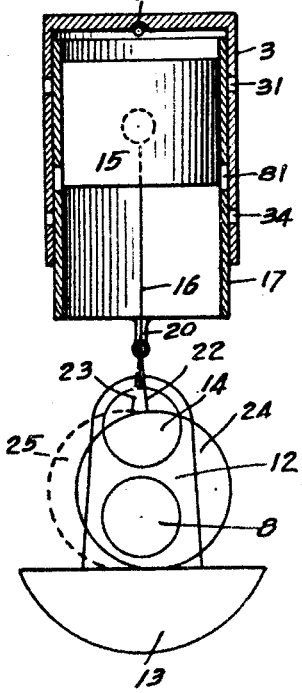
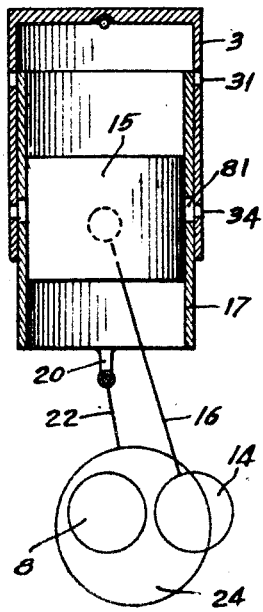
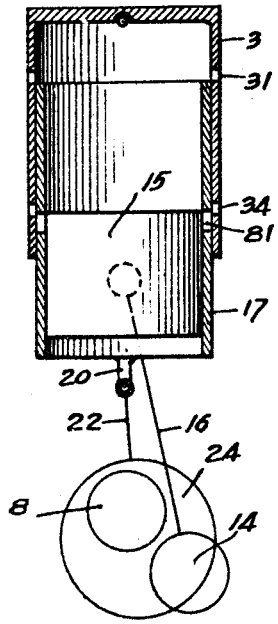
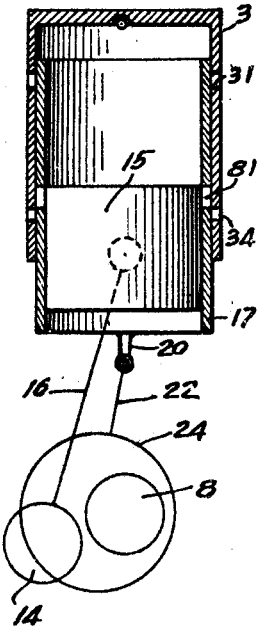
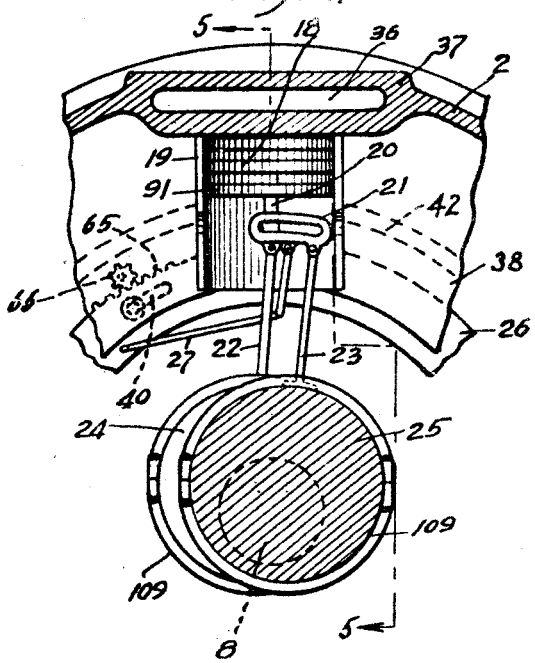
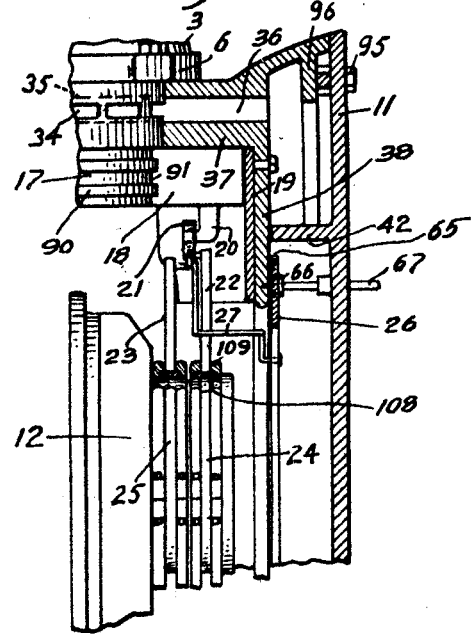
INVENTOR.
George Riley,
BY R. W. Smith
ATTORNEY.

Patented July 8, 1930

1,770,111

UNITED STATES PATENT OFFICE

GEORGE RILEY, OF LOS ANGELES, CALIFORNIA

INTERNAL-COMBUSTION ENGINE

Application filed October 3, 1927. Serial No. 223,572.

This invention is an internal combustion engine particularly adapted for aeroplane propulsion and arranged for two cycle operation, the engine being readily adapted for combustion of the working charge by either carburetion of the fuel and spark ignition, or by compression of fuel with ignition by fuel spray injection.

It is an object of the invention to provide a two cycle operation employing a single movable valve for controlling both the intake and the exhaust, the movable valve being preferably adapted for sliding movement between the working piston and the cylinder wall so as to open and close the intake and exhaust in the proper sequence with relation to the position of the piston, and the sliding valve being adapted to open the exhaust in advance of opening of the intake after the charge has been fired in order to exhaust the spent charge, and to then retain both the exhaust and intake in open position for scavenging the cylinder by the pressure under which the incoming charge is supplied to the cylinder, and to finally close the exhaust prior to closing of the intake so that at the beginning of the compression stroke the charge which has been forced into the cylinder will already be under pressure in accordance with that utilized for supplying the charge.

It is a further object of the invention to provide a properly timed, dependent operation of the sliding valve and working piston, and to arrange for readily removing the sliding valve for inspection or repair by simply removing the engine cylinder without opening the crank case and without the necessity for disturbing either the valve operating mechanism or the working piston and its connecting rod.

It is a still further object of the invention to seal the valve structure with relation to the intake and exhaust ports so as to permit operative sliding movement of the valve but at the same time insure tight closing of the exhaust and prevent leakage of fuel to the crank case or escape of pressure from the incoming charge.

It is a still further object of the invention to provide for readily reversing the direction of travel of the sliding valve so as to reverse the direction of rotation of the engine, and to connect the drive shaft of the engine to the blower which supplies the fuel charge under pressure, so that irrespective of reverse rotation of the engine the blower will turn continuously in the same direction for forcing the fuel into the cylinder.

It is a still further object of the invention to incorporate the improved construction in an engine having a plurality of radial cylinders, with the connecting rods of the different cylinders preferably engaged by a common crank pin and the operating connections for the sliding valves of the different cylinders preferably also engaged by a common actuating means which may be an eccentric on the crank shaft.

It is a still further object of the invention to particularly adapt the radial engine for aeroplane propulsion by making the crank case of stream line section so that the engine may be mounted at the forward end of the fuselage without the necessity of cowling-in the engine to provide the desired stream line contour. As a consequence the engine is readily accessible for repairs or the like and the crank case is exposed directly to the cooling effect of the air so that it is possible to appreciably retard rise in temperature of the engine oil which is in direct contact with the inner surface of the crank case.

It is a still further object of the invention to provide a carburetor connection for the engine arranged whereby the fuel charge will flow downwardly into the blower which supplies the charge to the cylinders, and will be thence drawn downwardly through the blower for discharge under pressure at the intake manifold, thereby insuring a proper fuel mixture and greater acceleration at all engine speeds.

Further objects of the invention will be readily understood from the following description of the accompanying drawings, in which:

Fig. 1 is a vertical axial section through the engine mounted in an aeroplane.

Fig. 2 is a transverse section on the line 2—2 of Fig. 1.

Fig. 3 is a transverse section on the line 3—3 of Fig. 1.

Fig. 4 is a detail section on the line 4—4 of Fig. 1.

Fig. 5 is a vertical section on the line 5—5 of Fig. 4.

Fig. 6 is a transverse section on the line 6—6 of Fig. 2.

Fig. 7 is a vertical section on the line 7—7 of Fig. 2.

Fig. 8 is a horizontal section on the line 8—8 of Fig. 1 showing the cylinder removed.

Fig. 9 is a horizontal section of the line 9—9 of Fig. 1.

Fig. 10 is a fragmentary plan view partly broken away, showing the driving connection for the blower.

Fig. 11 is a diagrammatic showing of a cylinder of the engine with the parts in firing position.

Fig. 12 is a similar view showing the exhaust starting to open.

Fig. 13 is a similar view showing the intake starting to open.

Fig. 14 is a similar view showing the intake starting to close.

The engine in its preferred embodiment is adapted for use in an aeroplane, and is shown as having a crank case comprising a transverse front wall 1 and a rearwardly extending annular side wall 2 of stream line section and terminating in a rear open end. Cylinders 3 project radially from the crank case, and in the present instance are three in number, the inner ends of the cylinders being removably received in radial bores 4 in the crank case wall, with the outer surface of the crank case forming flat abutment surfaces 5 surrounding these bores, so that shoulders 6 of the cylinders may engage the abutment surfaces and be fixed thereto by studs 7.

The crank shaft 8 extends through a bearing 9 on front wall 1 with the projecting end of the shaft adapted to receive a usual propeller (not shown), and the rear end of the shaft is journaled in a bearing 10 provided on a cover plate 11 which is adapted to close the open rear end of the crank case. The shaft 8 has crank arms 12, preferably counter-balanced as shown at 13, and connected by a crank pin 14 in alinement with cylinder bores 4, and pistons 15 reciprocate in cylinders 3 with their connecting rods 16 engaged by the common crank pin 14.

A sliding valve cooperates with each of the cylinders and pistons to control both the intake and the exhaust, the valve in the present instance sliding between the cylinder and piston and comprising an annular sleeve 17 having open ends. The inner end of the sleeve extends inwardly beyond the inner end of the cylinder and is engaged by a connecting block 18 which slides in a guide 19 for reciprocating the sleeve valve, the arrangement being such that the blocks 18 for the various cylinders are reciprocated by a common actuating means provided on the crank shaft 8 and adapted to properly time the movement of the sleeve valves with relation to their corresponding pistons.

The means for reciprocating the sleeve valves may be arranged so that the direction of movement of the valves may be reversed at will to cause reverse rotation of the motor, and in the present instance this reversible actuating means is a usual link and eccentric construction. As an instance of this arrangment an arm 20 depends from each of the blocks 18 and is connected to a link 21 so that the latter is adapted for transverse sliding movement relative to the arm, and eccentric rods 22—23 are pivoted to the respective ends of the link with the rods 22 and 23 for the plurality of cylinders operated by common eccentric 24 and 25 which are mounted on shaft 8 with their axes equidistantly circumferentially spaced in opposite directions from the crank arms 12.

With links 21 shifted so that eccentric rods 22 are in alinement with arms 20 the engine is adapted for normal operation with eccentric 24 reciprocating sleeve valves 17 slightly in advance of the corresponding piston reciprocation, but by dependently shifting the reversing links 21 so that rods 23 aline with arms 20 the sleeve valves are reciprocated by eccentric 25, which as shown in Fig. 4, will cause reverse movement of the valves and thereby reverse the rotation of the motor.

Any suitable means may be employed for dependently shifting links 21, and in the present instance the shifting means is shown as a circumferentially movable ring 26 mounted in the crank case with actuating rods 27 pivoted to the ring adjacent the respective cylinders of the motor, and the opposite end of each actuating rod pivoted to the corresponding link 21, preferably medially of its length, so that blocks 18 may be reciprocated by either eccentric 24—25 without appreciable movement of rods 27, but shifting of the latter by partially turning ring 26 will shift the reversing links 21 to reverse the motor as previously described.

The cylinders 3 have exhaust and intake ports adjacent their outer and inner ends respectively. The exhaust preferably comprises an annular conduit 30 formed in the cylinder wall so as to open into the cylinder through an annular port 31, and this conduit discharges into a suitable exhaust pipe 32 through a usual coupling 33. The exhaust pipes leading from the respective cylinders may if desired communicate with a common exhaust manifold (not shown).

The intake for the cylinder is in its inner end portion which extends into bore 4, and is shown as a plurality of circumferentially spaced slots forming an annular intake 34.

The wall of bore 4 overlies this annular intake and forms an annular conduit 35 communicating with the intake, and the conduit 35 in turn communicates with a bore 36 formed in a rearward extension 37 of the wall of bore 4.

An annular flange 38 extends into the crank case and forms the rear ends of the extensions 37 for the different cylinders, and the bores 36 open into an intake manifold formed in back of this flange. The flange also forms a support for guides 19 as shown in Fig. 5; and provides a mounting for ring 26 which may be guided thereon and limited in its circumferential movement by pin and slot connections 40.

The intake manifold which communicates with the bores 36 is an annular chamber between flange 38 and cover plate 11, with its outer and inner peripheries defined respectively by the crank case wall and by an axially extending annular flange 42 which depends from the cover plate and abuts against flange 38 as shown in Fig. 1. A port 43 opens into the intake manifold through cover plate 11, and is preferably positioned at the bottom of the engine structure as shown in Fig. 3. This port communicates with a supply conduit 44 which extends axially through a gear casing 45 mounted on the back of cover plate 11, and a blower 46 is mounted on the back of casing 45 with its discharge 47 at the bottom of the blower and communicating with conduit 44 as shown in Figs. 1 and 3.

The blower is preferably of the type having cooperating 8-shaped impellers 50 mounted on parallel shafts 51—52, and these shafts are dependently rotated in opposite directions for operating the blower, by meshing gears 53—54 fixed on the projecting ends of the shafts in casing 45. This gearing is preferably driven from the engine shaft 8, and the driving connection is adapted to be reversed so as to continuously operate the blower in the same direction adapted to force a charge into the intake manifold, irrespective of reverse rotation of the motor.

As an instance of this arrangement the drive shaft 8 may operably engage a shaft 55 which is journaled in casing 45, the driving connection being shown as a usual key construction 56 permitting ready disassembly of the parts; and a gear 57 is slidably mounted on shaft 55 for rotation therewith, the driving connection being shown as a usual key and slot structure 58. By sliding gear 57 along shaft 55 it is adapted to mesh with either a gear 59 on impeller shaft 51 or with a similar gear 60 which is fixed for rotation with impeller shaft 52, in order to provide a reverse driving connection for the meshing gears 53—54, and consequently by thus shifting gear 57 when rotation of the engine is reversed, the impeller shafts will continue to turn in the proper direction for operating the blower.

Sliding gear 57 may be shifted by a suitable manual control shown as forked lever 62 engaging the gear and actuated by a rod 63 which may have a suitable hand lever 64 at a convenient point outside of gear casing 45; and this hand lever is preferably conveniently adjacent the control whereby ring 26 is circumferentially shifted for reversing the direction of rotation of the motor.

The means for shifting ring 26 may include a segmental gear 65 cut in the outer periphery of the ring as shown in Fig. 4, with a pinion 66 meshing with this gear and mounted on a shaft 67 which extends rearwardly through cover plate 11 and gear casing 45 as shown in Fig. 1; and the shaft 67 may be rotated and locked with ring 26 in its respective shifted positions, by a worm and pinion driving connection 68 which is shown as manually operated by a hand wheel 69.

In the form of the invention illustrated the engine is operated by carbureted fuel and spark ignition, although it will be readily apparent that the invention may be incorporated in a Diesel construction by substituting fuel spray injection for the spark plugs 71 and utilizing the blower 46 for supplying fuel at the necessary pressure. When employing spark ignition and a carburetor, a usual magneto 72 may be mounted on gear casing 45 and driven from gear 57, which irrespective of its shifting is adapted to mesh with a gear 73 fixed on the magneto shaft 74; and a usual carburetor 75 having an air supply 76 and a fuel supply 77 is adapted to supply a combustible charge to the intake 78 of the blower.

The carburetor is so positioned that the combustible charge is drawn downwardly into the blower, and the blower with its intake 78 at its top and its discharge 47 at its bottom also provides a downward path of travel for the charge as it is compressed, thereby assuring complete carburetion and proper supplying of the compressed charge to the engine at all engine speeds.

The combustible charge under desired pressure being thus supplied to the intake manifold and thence to the intake bores 36 for the respective cylinders, the cycle of operation is as follows, reference being had to Figs. 11 to 14.

Fig. 11 shows the start of the firing stroke, piston 15 being at the top of its stroke ready for downward movement to turn the crank shaft, and the eccentric 24 operating sleeve valve 17 so that the latter has just passed upper dead center and will move downwardly in advance of the piston with the motor turning in the direction indicated by the arrow A. The sleeve valve is ported intermediate of its length with said port preferably comprising a plurality of circumferentially spaced slots as shown at 81, and with the parts in the position described, the port 81 is between and spaced from both intake 34 and exhaust 31 so as to form a closed chamber above the piston, and in which a combustible charge is compressed ready for ignition.

When the charge is ignited by spark plug 71 and the piston has been forced downwardly one-half of its stroke, the parts are in the position shown in Fig. 12, with the upper end of sleeve valve 17 ready to uncover exhaust port 31 and the valve port 81 alining with intake 34 which however is still closed by the piston.

Continuation of the stroke thus opens the exhaust for escape of the spent charge and subsequently opens the intake by the piston uncovering the alined ports 81—34, this position of the parts being shown in Fig. 13 with the intake just starting to open and the exhaust remaining open so that the pressure of the incoming charge will scavenge the cylinder of the spent charge.

The port 81 is axially longer than port 34 so that the intake as well as the exhaust remains open as the piston passes lower dead center, and upon the up-stroke of the piston the sleeve valve moving upwardly in advance of the piston will first close the exhaust port 31 so that the intake which is still open will supply a combustible charge which will be compressed in the cylinder to the pressure provided by the blower. The intake is then closed by port 81 moving beyond port 34, the position of the parts being shown in Fig. 14, and with the cylinder thus completely closed the remainder of the up-stroke of the piston will compress the charge ready for firing so that the cycle of operation may be repeated.

When links 21 are shifted so as to reverse the motor, the eccentric 25 instead of eccentric 24 controls the sleeve valve 17, and since these eccentrics are oppositely circumferentially spaced from crank pin 14, the sleeve valve will be reciprocated in the opposite direction by eccentric 25 as shown in dotted lines in Fig. 11, and the piston on its firing stroke will thus turn the crank shaft in the opposite direction from upper dead center.

The piston 15 is provided with usual packing rings 83, and sleeve valve 17 preferably also has a leak-proof sliding fit obtained by the use of packing rings 84—85. The rings 84 are at points in both directions axially beyond exhaust port 31, and rings 85 are similarly positioned axially beyond port 81 in both directions as shown in Fig. 7; and consequently the exhaust is sealed-off, and loss of blower pressure or leakage of fuel in to the crank case is also eliminated.

When making repairs the cylinders 3 are readily removable and the sleeve valves 17 may then also be removed without opening the crank case. For this purpose block 18 releasably engages the inner end of sleeve 17 by means of annular ribs 90 on the sleeve adapted for engagement by an arcuate face of block 18 which is correspondingly ribbed as shown at 91. With cylinder 3 in place and sleeve valve 17 concentrically mounted therein, the ribs 90—91 are in engagement so as to move the sleeve valve with its operating block 18, but when cylinder 3 is removed the resulting annular space in bore 4 permits lateral shifting of sleeve 17 so as to disengage ribs 90—91 as shown in Fig. 8, and thus permits free withdrawal of the valve without disturbing its operating connection. Such lateral shifting of the sleeve valve causes a corresponding shifting of the piston which is mounted therein, and to permit such movement of the piston while its connecting rod remains in usual position, the wrist pin 92 on which the bearing 93 of the connecting rod is journaled, is adapted for axial sliding movement through the bearing in the direction to permit the desired shifting of the sleeve valve and piston as shown in Fig. 8.

The removable cover plate 11 is preferably held in place by bolts 95 adapted to engage an annular flange 96 extending inwardly from the wall of the crank case, and the gear casing 45 may be in turn removably fixed to the cover plate by bolts 97 projecting from flange 96. The stream line crank case of the engine 38 is adapted to form the nose of the fuselage of an aeroplane without the necessity of cowling over the engine, and as an instance of this arrangement the engine is shown mounted in the frame work of the nose of fuselage 100 by means of the annular angle iron 101 on cover plate 11, the surface of the fuselage forming a stream line continuation of the surface of the crank case as shown in Fig. 1, and the crank case being thus fully exposed to the air for maximum cooling of the cylinders which may be provided with usual fins 102, as well as maximum cooling of the crank case oil.

The detailed arrangement whereby connecting rods 16 may engage a common crank pin, and the eccentric rods 22—23 may be operated from common eccentrics 24—25, is illustrated in Figs. 1 and 5. The connecting rods 16 terminate in arcuate bearings 105 which engage crank pin 14, and these arcuate bearings are held against radial displacement by being received in under-cut grooves 106 formed in split rings 107 which are journaled on the crank pin. In similar manner the eccentric rods 22—23 terminate in arcuate bearings 108 which are journaled on the eccentrics 24—25 and are held in place by the reception of their edges in the grooves of split rings 109 which are mounted on the eccentrics.

I claim:

1. An internal combustion engine comprising a crank case, a crank shaft, the crank case having a bore in alinement with the crank, a cylinder removably mounted in said bore, a piston in the cylinder, a connecting rod between the piston and crank, a sleeve valve slidable between the cylinder and piston and extending into the crank case, a reciprocating block in the crank case, an operating connection between the block and the crank shaft, an operating connection between the sleeve valve and reciprocating block adapted for automatic engagement when the sleeve valve is operatively positioned in the cylinder and adapted for automatic disengagement to permit free withdrawal of the sleeve valve by laterally shifting the sleeve valve in the crank case bore when the cylinder has been removed, and a sliding connection between the piston and its connecting rod permitting lateral shifting of the piston relative to its connecting rod in accordance with said lateral shifting of the sleeve valve.

2. An internal combustion engine including a cylinder, a piston in the cylinder, valve mechanism for the cylinder including an extension projecting beyond the inner end of the cylinder, operating means for the valve mechanism, a connection between the operating means and said extension adapted for ready engagement or disengagement by lateral shifting of said extension, and a mounting for said extension permitting said lateral shifting.

3. An internal combustion engine including a cylinder, a piston in the cylinder, valve mechanism for the cylinder including an extension projecting beyond the inner end of the cylinder, operating means for the valve mechanism, cooperating ribs on the operating means and on said extension forming a connection between the operating means and said extension adapted for ready engagement or disengagement by lateral shifting of said extension, and a mounting for said extension permitting said lateral shifting.

4. An internal combustion engine including a cylinder, a piston in the cylinder, a sleeve valve between the cylinder and piston including an extension projecting beyond the inner end of the cylinder, operating means for the valve, a connection between the operating means and said extension adapted for ready engagement or disengagement by lateral shifting of the sleeve valve, and a mounting for the sleeve valve permitting said lateral shifting when the cylinder has been removed.

5. An internal combustion engine including a cylinder, a piston in the cylinder, a connecting rod connected to the piston, a sleeve valve between the cylinder and piston including an extension projecting beyond the inner end of the cylinder, operating means for the valve, a connection between the operating means and said extension adapted for ready engagement or disengagement by lateral shifting of the sleeve valve, a mounting for the sleeve valve permitting said lateral shifting when the cylinder has been removed, and a sliding connection between the piston and its connecting rod permitting lateral shifting of the piston relative to its connecting rod in accordance with said lateral shifting of the sleeve valve.

6. An internal combustion engine comprising a crank case having a bore for a cylinder, a cylinder removably mounted in said bore, a piston in the cylinder, valve mechanism for the cylinder including an extension projecting beyond the inner end of the cylinder into the crank case, operating means for the valve mechanism, a connection between the operating means and said extension adapted for ready engagement or disengagement by lateral shifting of said extension, and a mounting for said extension permitting said lateral shifting in the crank case bore when the cylinder has been removed.

7. An internal combustion engine comprising a crank case having a bore for a cylinder, a cylinder removably mounted in said bore, a piston in the cylinder, a sleeve valve between the cylinder and piston including an extension projecting beyond the inner end of the cylinder into the crank case, operating means for the sleeve valve, a connection between the operating means and said extension adapted for ready engagement or disengagement by lateral shifting of the sleeve valve, and a mounting for the sleeve valve permitting said lateral shifting in the crank case bore when the cylinder has been removed.

8. An internal combustion engine comprising a crank case having a bore for a cylinder, a cylinder removably mounted in said bore, a piston in the cylinder, a connecting rod connected to the piston, a sleeve valve between the cylinder and piston including an extension projecting beyond the inner end of the cylinder, operating means for the valve, a connection between the operating means and said extension adapted for ready engagement or disengagement by lateral shifting of the sleeve valve, a mounting for the sleeve valve permitting said lateral shifting in the crank case bore when the cylinder has been removed, and a sliding connection between the piston and its connecting rod permitting lateral shifting of the piston relative to its connecting rod in accordance with said lateral shifting of the sleeve valve.

9. An internal combustion engine comprising a crank case having a bore for a cylinder, a cylinder removably mounted in said bore, a piston in the cylinder, a connecting rod connected to the piston, a sleeve valve between the cylinder and piston including an extension projecting beyond the inner end of the cylinder into the crank case, operating means for the valve, cooperating ribs on the operating means and on said extension forming a connection between the operating means and said extension adapted for ready engagement or disengagement by lateral shifting of the sleeve valve, a mounting for the sleeve valve permitting said lateral shifting in the crank case bore when the cylinder has been removed, and a sliding connection between the piston and its connecting rod permitting lateral shifting of the piston relative to its connecting rod in accordance with said lateral shifting of the sleeve valve.

10. An internal combustion engine including a readily removable cylinder, a piston in the cylinder, a sleeve valve between the cylinder and piston, operating means for the sleeve valve, means for connecting the sleeve valve to said operating means whereby said operating means is adapted to positively shift the sleeve valve in either of opposite directions, said connecting means being adapted for ready engagement or disengagement simply by moving the sleeve valve relative to its operating means and without disturbing said operating means, and a mounting for the sleeve valve permitting said movement thereof when the cylinder is removed.

11. An internal combustion engine including a cylinder, a piston in the cylinder, a sleeve valve between the cylinder and piston, operating means for the sleeve valve, means for connecting the sleeve valve to said operating means whereby said operating means is adapted to positively shift the sleeve valve in either of opposite directions, said connecting means being adapted for ready engagement or disengagement simply by moving the sleeve valve relative to its operating means.

In testimony whereof I have affixed my signature.

GEORGE RILEY.